(12) United States Patent
Carmean et al.

(10) Patent No.: US 10,605,349 B2
(45) Date of Patent: Mar. 31, 2020

(54) LUBRICANT FLOW REGULATING SYSTEM AND THE AXLE ASSEMBLY MADE THEREWITH

(71) Applicant: DANA HEAVY VEHICLE SYSTEMS GROUP, LLC, Maumee, OH (US)

(72) Inventors: Daniel D. Carmean, Swanton, OH (US); Aaron D. Gries, Perrysburg, OH (US); Greg C. Parent, Ann Arbor, MI (US); Benjamin J. Passino, Maumee, OH (US); Joshua A. Perry, Maumee, OH (US); Chris Wurzer, Freedom, WI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 85 days.

(21) Appl. No.: 15/775,604

(22) PCT Filed: Nov. 11, 2016

(86) PCT No.: PCT/US2016/061541
§ 371 (c)(1),
(2) Date: May 11, 2018

(87) PCT Pub. No.: WO2017/083658
PCT Pub. Date: May 18, 2017

(65) Prior Publication Data
US 2018/0372209 A1    Dec. 27, 2018

Related U.S. Application Data

(60) Provisional application No. 62/255,090, filed on Nov. 13, 2015, provisional application No. 62/255,116, filed on Nov. 13, 2015.

(51) Int. Cl.
*F16H 57/04*  (2010.01)
*F16H 57/037*  (2012.01)

(52) U.S. Cl.
CPC ....... *F16H 57/0409* (2013.01); *F16H 57/037* (2013.01); *F16H 57/0424* (2013.01);
(Continued)

(58) Field of Classification Search
CPC .................................................. F16H 57/0483
See application file for complete search history.

(56) References Cited

U.S. PATENT DOCUMENTS

| 2,368,963 A | 2/1945 | Boden |
| 4,480,493 A | 11/1984 | Takahashi |

(Continued)

FOREIGN PATENT DOCUMENTS

JP    2007315456    12/2007

OTHER PUBLICATIONS

European Patent Office, International Search Report with written opinion issued in PCT/US2016/061541, dated Feb. 16, 2017, 17 pages, European Patent Office, Rijswijk Netherlands.

*Primary Examiner* — Derek D Knight
(74) *Attorney, Agent, or Firm* — Marshall & Melhorn, LLC

(57) ABSTRACT

An axle assembly includes a carrier housing, a ring gear disposed within the carrier housing, and a pinion meshed with the ring gear. The pinion is coupled with a pinion shaft rotatably supported in the carrier housing by at least one bearing. A sump and a fluid catch are disposed in the carrier housing. A conduit having a regulator is in fluid communication with the fluid catch and the at least one bearing.

17 Claims, 18 Drawing Sheets

(52) U.S. Cl.
CPC ..... *F16H 57/0434* (2013.01); *F16H 57/0457* (2013.01); *F16H 57/0469* (2013.01); *F16H 57/0471* (2013.01); *F16H 57/0483* (2013.01)

(56) References Cited

U.S. PATENT DOCUMENTS

| | | |
|---|---|---|
| 5,232,291 A | 8/1993 | Kuan |
| 6,398,687 B2 | 6/2002 | Iwata |
| 7,445,574 B2 | 11/2008 | Weith |
| 8,469,852 B2 | 6/2013 | Gianone |
| 8,512,193 B1 | 8/2013 | Hilker |
| 8,579,088 B2 | 11/2013 | Martin, III |
| 8,746,405 B2 | 6/2014 | Perakes |
| 8,821,332 B2 | 9/2014 | Kawamura |
| 9,052,009 B2 | 6/2015 | Barillot |
| 2014/0116807 A1 | 5/2014 | Paielli |

LUBRICANT FLOW REGULATING SYSTEM AND THE AXLE ASSEMBLY MADE THEREWITH

RELATED APPLICATIONS

The present application claims the benefit to U.S. Provisional Application No. 62/255,090 filed on Nov. 13, 2015, and to U.S. Provisional Application No. 62/255,116 filed on Nov. 13, 2015, each of which is incorporated herein by reference in its entirety.

BACKGROUND

The present disclosure relates to an axle assembly. An axle assembly may utilize a differential apparatus in wheeled vehicle drivetrains to permit an outer drive wheel to rotate at a greater velocity than an inner drive wheel when operating a vehicle through a turn. Axle assemblies often employ a pinion gear drivingly engaged with a ring gear, which in turn rotates a differential case comprising a number of planet gears or bevel gears. The pinion gear is often coupled with a pinion shaft supported within the carrier housing by one or more pinion bearings. In many applications, lubricating the pinion bearings is necessary for optimum performance thereof. However, the resistance caused by the lubricant in the bearings is known to be a source of system power loss that degrades fuel economy.

The present subject matter discloses a system and apparatus for regulating the volume of lubricant distributed to the axle assembly pinion bearings in a simple and cost effective manner.

SUMMARY

In one form, the present disclosure provides an axle assembly including a carrier housing, a ring gear disposed within the carrier housing, and a pinion meshed with the ring gear. The pinion is coupled with a pinion shaft rotatably supported in the carrier housing by at least one bearing. A sump and a fluid catch are disposed in the carrier housing. A conduit is in fluid communication with the fluid catch and the at least one bearing. Additionally, a regulator may be disposed in the conduit.

DETAILED DESCRIPTION OF EMBODIMENTS

Figure 1:
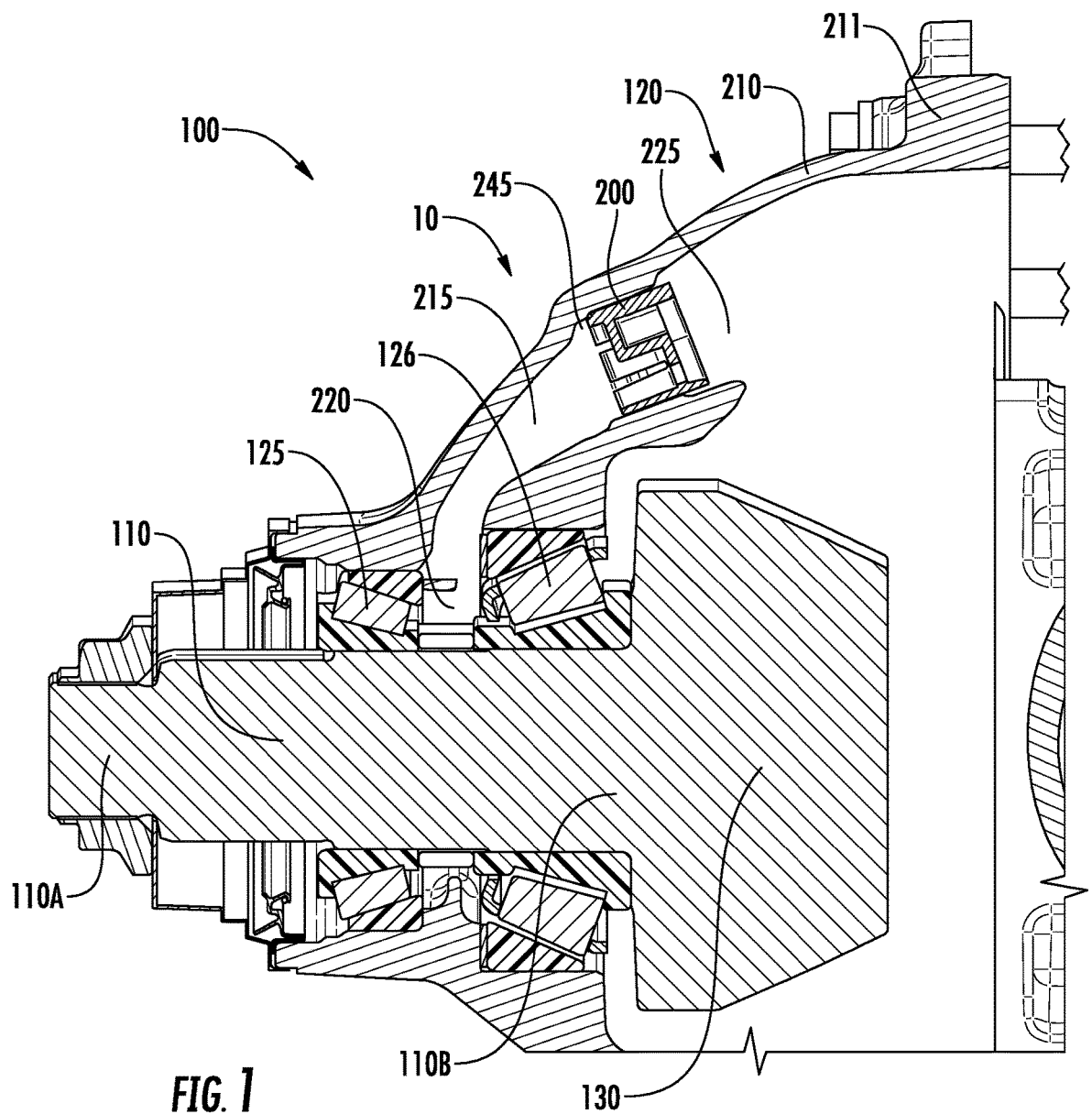
FIG. 1 is a cross-sectional view of a portion of an axle assembly according to an embodiment of the presently disclosed subject matter.

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

As illustrated in FIG. 1, certain embodiments of a lubricant regulating system 10 are used with an axle assembly 100. However, the lubricant regulating system 10 is not limited to use with the axle assemblies described herein. Instead, the lubricant regulating system 10 may be utilized with axle assemblies of other shapes, sizes, orientations, and designs. The lubricant regulating system 10 will be described in connection with a vehicle (not depicted). It would be understood by one having skill in the art that the various embodiments of the lubricant regulating system 10 described herein may have applications to commercial and off-highway vehicles. Furthermore, it would be understood by one having skill in the art that these embodiments could have industrial, locomotive, military, and aerospace applications, as well as applications in passenger, electric, and autonomous or semi-autonomous vehicles.

In an embodiment, the axle assembly 100 comprises a pinion shaft 110. The pinion shaft 110 further comprises a tail end 110A and a head end 110B. The pinion shaft 110 is rotatably supported in a carrier housing 120 by a pair of spaced apart pinion bearings 125, 126. The pinion bearings 125, 126 may be disposed between the tail end 110A and the head end 110B of the pinion shaft 110. Disposed at the pinion shaft head end 110B is a pinion gear 130. Coupled with the pinion shaft tail end 110A is a drive shaft (not depicted). The pinion shaft 110 receives rotation from a power source (not depicted) such as, but not limited to, a transmission or an engine coupled with the drive shaft. In turn, the pinion shaft 110 transfers rotational drive to a ring gear 135 (seen in FIG. 5) drivingly engaged with the pinion gear 130.

Figure 5:
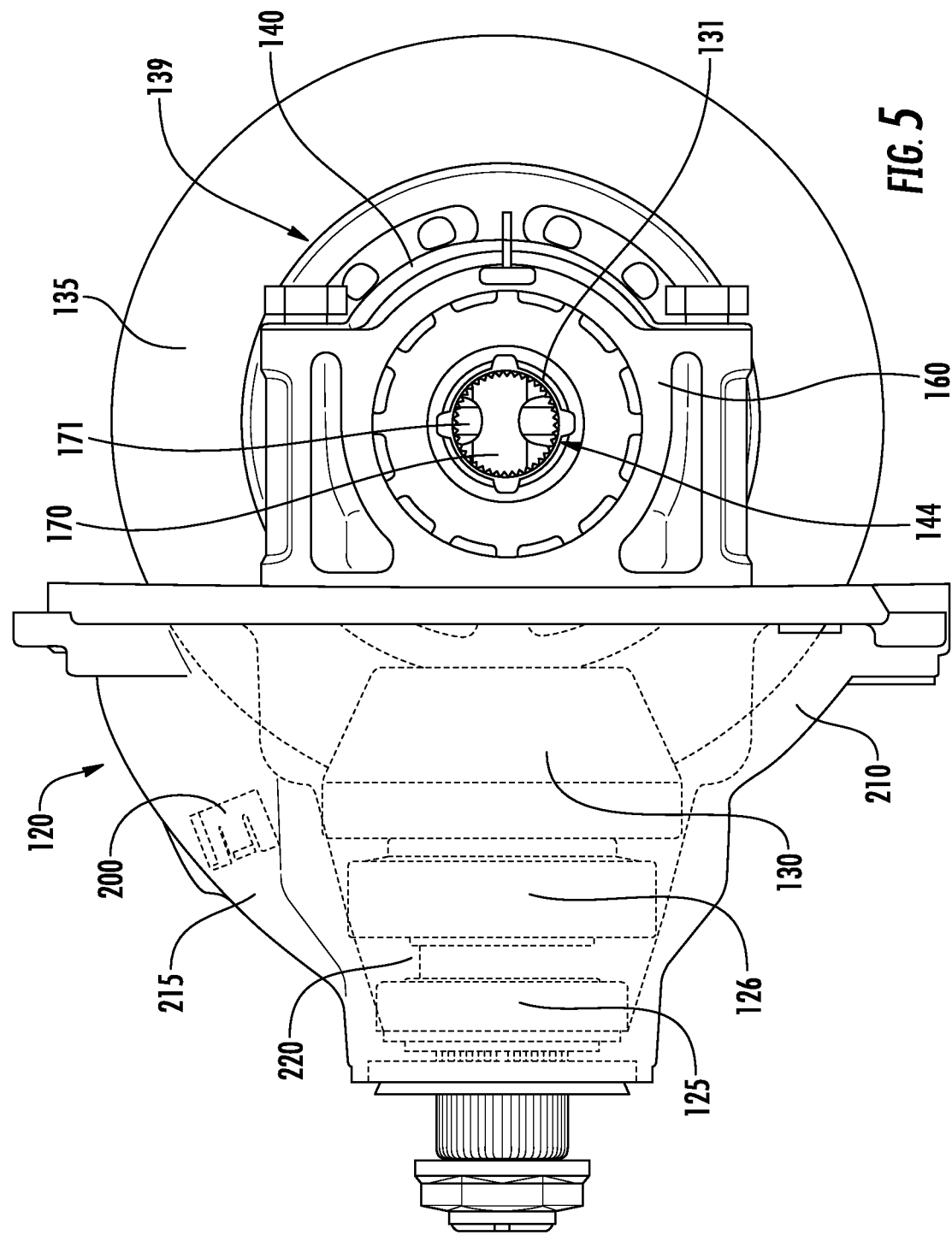
FIG. 5 is a view of a portion of the drive unit apparatus of FIG. 1 showing certain elements disposed within the axle housing.

As illustrated in FIG. 5, a differential assembly 139 may comprise a differential case 140. The differential case 140 may be mounted for rotation within the carrier housing 120 via a pair of differential bearings (not depicted). The differential bearings may be coupled with a pair of carrier housing pedestals (not depicted) via a pair of differential bearing caps 160. The differential case 140 is coupled with the ring gear 135, and rotates therewith. The differential case 140 may be coupled with the ring gear 135 in a conventional manner, including via a plurality of mechanical fasteners or welding.

In an embodiment, the differential case 140 may comprise a hollow interior. A pair of cross shafts 170, 171 extend through the differential case 140 hollow interior and are coupled at their ends to the differential case 140. Differential pinion gears (not depicted) are mounted on the ends of the cross shaft 170, 171. The differential pinion gears are in mesh with side gears (not depicted) within the differential case 140. The differential assembly 139 transmits power to left and right side axle shafts (not depicted) via the side gears. The side gears comprise splines 131 in mesh with ends of the axle shafts. The differential case 140 further comprises a pair of shaft bores 144. The axle shafts are inserted through the bores 144 and into mesh with the side gear splines 131. In an embodiment, the axle shafts are secured in their position in the differential case 140 by c-clips (not depicted) inserted into grooves in the shafts. The differential assembly 139 may further comprise a retaining bolt (not depicted) which secures the cross shafts 170, 171 in the differential case 140.

As illustrated in FIGS. 1, 2, 3, and 5, in an embodiment, the carrier housing 120 comprises a forward portion 210. The forward portion 210 of the carrier housing 120 comprises a flange 211 for coupling a carrier housing cover (not depicted) to the forward portion 210. The carrier housing forward portion 210 and the cover define a space wherein the differential assembly 139 is disposed. Further, the carrier housing forward portion 210 and the cover define a lubricant sump (not depicted). The ring gear 135 is partially disposed in a volume of lubricant located in the lubricant sump. As the ring gear 135 rotates through the lubricant in the lubricant sump, the ring gear teeth carry a volume of the lubricant thereon.

The carrier housing forward portion 210 also comprises a lubricant channel 215. The lubricant channel 215 is in fluid communication with a pinion bearing cavity 220 at least partially disposed between the pinion bearings 125, 126. In one embodiment, the channel 215 is produced via casting during manufacture of the carrier housing 120. However, the channel 215 may also be produced after the carrier housing 120 is cast, via machining such as, but not limited to, boring, drilling, or electrochemical machining. In an embodiment, the channel 215 has an angle of approximately 21° between the general longitudinal axis of the channel 215 and a horizontal plane. A person having skill in the related art will recognize that the channel 215 may be disposed at numerous angles including, but not limited to, angles ranging from 0-180°. Further, the channel 215 may comprise a number of portions and surfaces disposed at multiple different angles with respect to each other.

Figure 3:
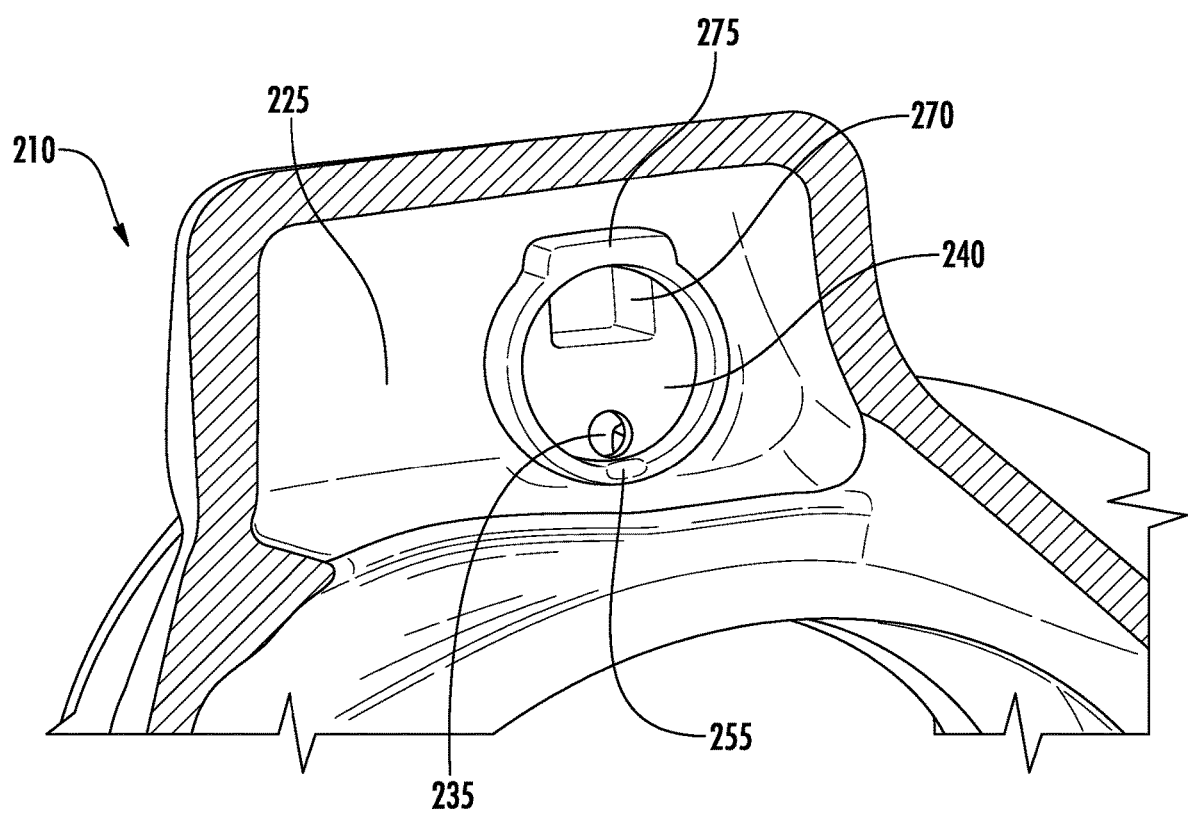
FIG. 3 is a perspective view of a section of the axle housing of FIG. 1.

Additionally, the carrier housing forward portion 210 comprises a lubricant catch 225. The lubricant catch 225 is in fluid communication with the channel 215. In an embodiment, the lubricant catch 225 comprises a scoop defined by the forward portion 210. In another embodiment, as illustrated in FIG. 3, the lubricant catch 225 may comprise a recessed chamber in the carrier housing forward portion 210. In an embodiment, as depicted in FIG. 3, the lubricant catch 225 comprises a generally rectangular-parallelepiped geometry, having an open side for receiving lubricant. However, the catch 225 may comprise any shape capable of receiving a predetermined volume of lubricant. In other embodiments, the lubricant catch 225 may comprise, but is not limited to, a generally spherical, pyramidal, cylindrical, or parallelepipedal geometry having an opening for receiving lubricant.

When the ring gear 135 rotates through the lubricant in the lubricant sump, the lubricant carried by the ring gear teeth, or a volume thereof, is impelled outwardly by rotation of the ring gear 135. The lubricant is thus slung against the carrier housing 120 and into the catch 225 in a predictable manner. In an embodiment, as illustrated in FIGS. 1-3 and 5, a regulator 200 may be disposed in the channel 215 to regulate the lubricant flow rate to the pinion bearing cavity 220. By regulating the lubricant flow rate to the pinion bearing cavity 220, the pinion bearings 125, 126 are required to pump a smaller volume of lubricant through their rollers, thereby reducing axle power consumption.

Figure 4:
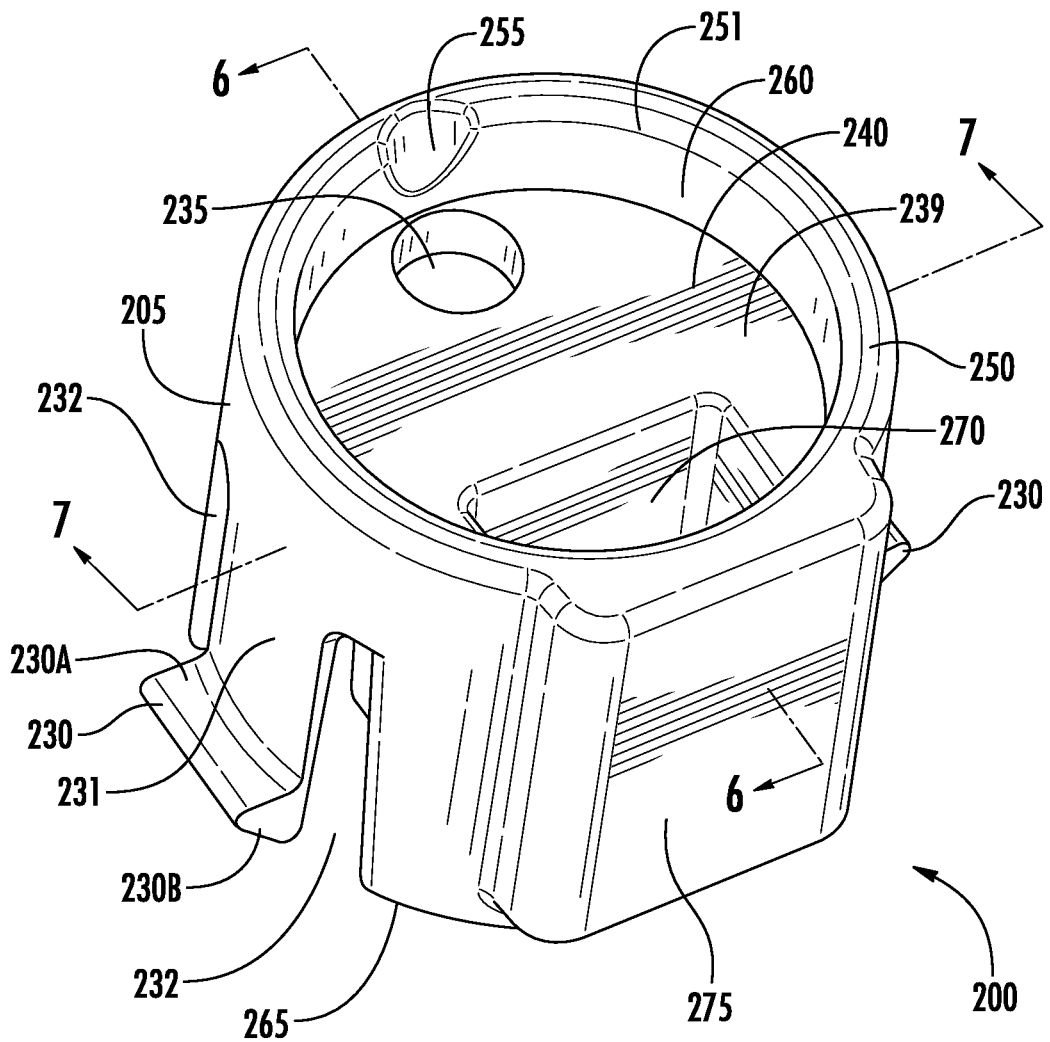
FIG. 4 is a perspective view of a regulator according to an embodiment of the presently disclosed subject matter.

As illustrated in FIG. 4, in an embodiment, the regulator 200 comprises a body 205 having a generally cylindrical shape. However, the shape of the regulator body 205 may be any shape which correlates to the shape of the channel 215; for example, the shape of a cross-section of the lubricant channel and the regulator body 205 may be, but is not limited to, circular, rectangular, triangular, or hexagonal. A portion of the regulator 200 may be in sealing engagement with the channel 215 to militate against lubricant passing between the regulator 200 and the channel 215. The regulator 200 includes a portion 239 having a surface 240 oriented in a plane generally perpendicular to the longitudinal axis of the regulator 200. The surface 240 may also be positioned in an angled plane. In an embodiment where the portion 239 comprises a plurality of surfaces, the surfaces may be positioned at a series of angles relative to the longitudinal axis of the regulator 200.

Figure 6:
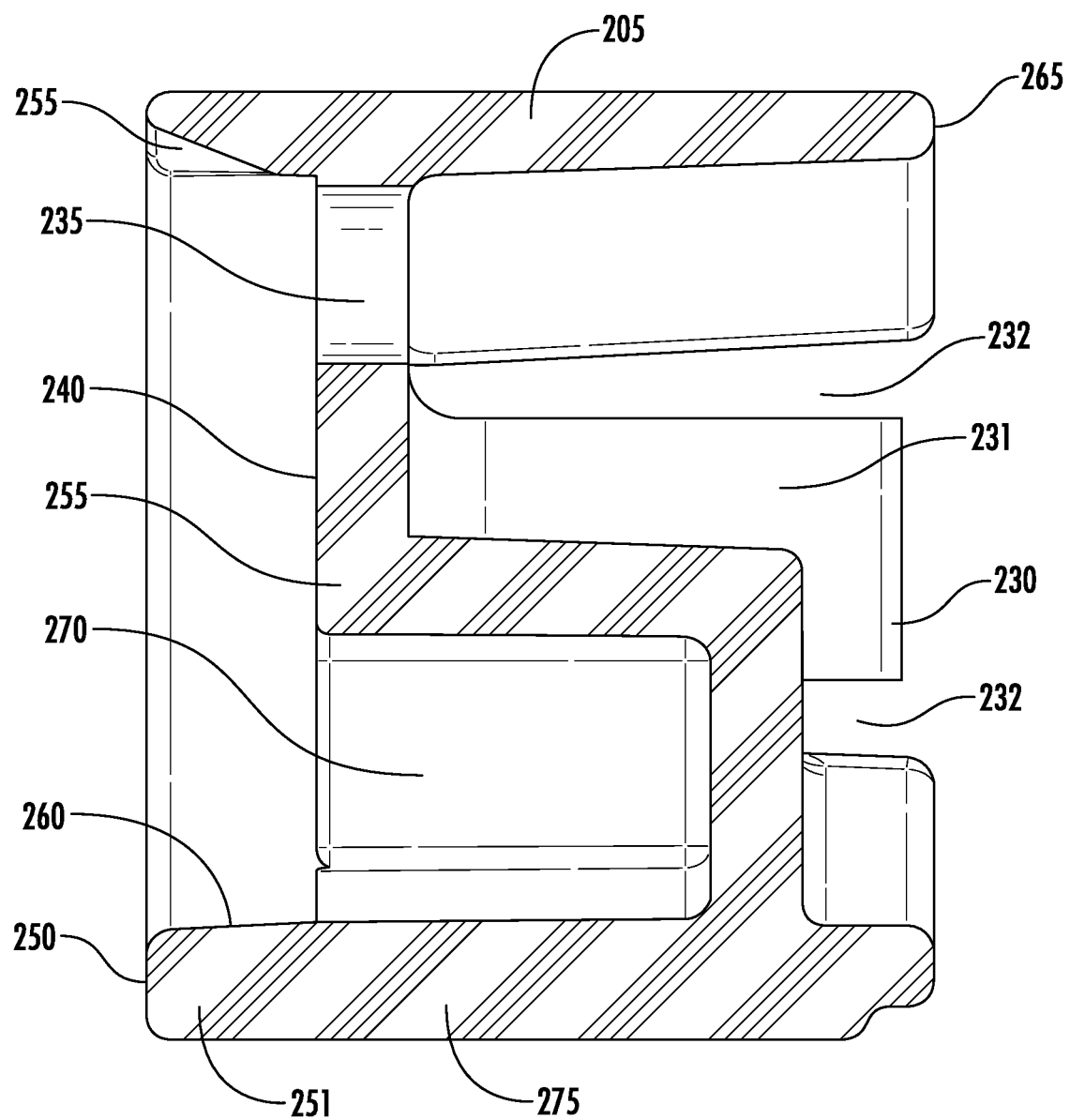
FIG. 6 is a cross-sectional view of the regulator of FIG. 4 along line 6-6.
Figure 7:
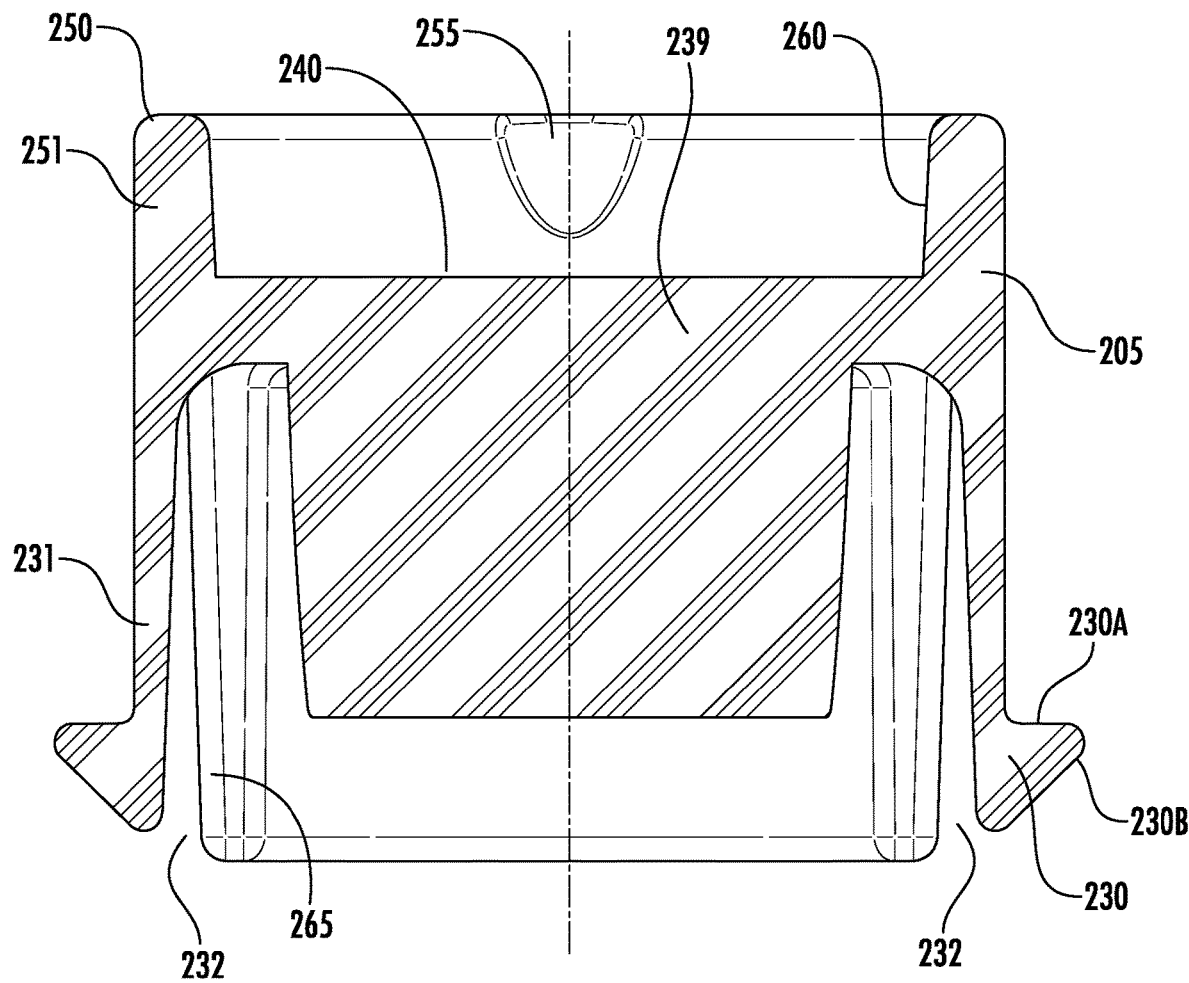
FIG. 7 is another cross-sectional view of the regulator of FIG. 4 along line 7-7.

Persons having skill in the art will recognize that the portion 239 may comprise any geometry which militates against lubricant flow therethrough, such as, but not limited to, a polyhedron, a disc, a cylinder, a rectangular prism, a triangular prism, a hexagonal prism, a pyramid, a cone, a sphere, a hemisphere, or any combination or series thereof. Further, as illustrated in FIGS. 4 and 6-7, the surface 240 may be recessed from a first end 250 of the regulator body 205. The regulator body first end 250 may comprise a lip 251 defined by the regulator body first end 250 and the portion 239. A flow hole 235 is disposed through the portion 239. The flow hole 235 may comprise a circumference located approximately tangential to the lip interior surface 260. The diameter of the flow hole 235 may vary, depending on the application and desired flow rate of lubricant. In certain embodiments, the flow hole 235 may have a diameter between 5 mm and 15 mm. The flow hole 235 may also comprise geometries such as, but not limited to, a rectangle, an oval, a crescent, a triangle, and a hexagon. The sealing engagement of the regulator 200 with the channel 215 and the position of the portion 239 militate against lubricant flow in the channel 215, and the flow hole 235 permits lubricant to flow through the channel 215 at a predetermined rate.

An angled concave depression 255 is disposed in the lip 251 and in the interior surface 260 of the regulator body 205. The depression 255 promotes lubricant flow through the flow hole 235 in embodiments having a high angle between the longitudinal axis of the flow hole 235 and a vector representing the lubricant flow by increasing the angle between the longitudinal axis of the flow hole 235 and the lubricant flow vector at which lubricant can directly enter the flow hole 235. Lubricant flow through the flow hole 235 may additionally, or in the alternative, be promoted by angling the catch 225 and/or angling the walls of the catch 225 to direct lubricant flow toward the flow hole 235. In an embodiment, the depression 255 may be generally cylindrical and have a diameter equal to a diameter of the flow hole 235. In another embodiment, the depression 255 may be generally circular and have a diameter between 1 and 30 millimeters. In yet another embodiment, the depression 255 may be generally circular with a longitudinal axis disposed at an angle between 1 and 90 degrees to the longitudinal axis of the flow hole 235. A person having ordinary skill in the relevant arts will recognize that the depression 255 may comprise multiple different geometries including, but not limited to, circular, rectangular, hexagonal, cylindrical, and oval.

In an embodiment, disposed in the surface 240 of the regulator 200, opposite the flow hole 235, is a substantially rectangular cavity 270 in the portion 239. A tool (not depicted) may be utilized to engage the rectangular cavity 270 to aid in assembling and aligning the regulator 200 with the carrier housing 120.

The regulator 200 may further comprise a radially extending rectangular projection 275. The rectangular projection 275 extends from the regulator first end 250 to a regulator second end 265. As illustrated in FIGS. 4 and 6, the rectangular projection 275 does not necessarily extend to the periphery of the second end 265. The rectangular projection 275 guides the installation of the regulator 200 into the channel 215 by coupling with a complimentarily shaped groove in the channel 215. Furthermore, the rectangular projection 275 ensures that the flow hole 235 is oriented at the bottom of the channel 215 and preserves the orientation of the regulator 200 during service. In an embodiment, the flow hole 235 is located at the bottom of the regulator 200 because lubricant may collect in the bottom of the catch 225. Placing the flow hole 235 at the bottom of the regulator 200 ensures a generally constant volume of lubricant will be available to enter the flow hole 235. However, certain embodiments of the regulator 200 may comprise a flow hole 235 located in other positions on the surface 240. In addition to the diameter of the flow hole 235, the location of the flow hole 235 may be used as a variable to control the volume flow rate of lubricant to the pinion bearings 125, 126.

As illustrated in FIGS. 4 and 7, the regulator 200 may further comprise a pair of tabs 230 disposed at the regulator second end 265. Each of the tabs 230 may comprise a radially extending projection having an upper surface 230A and a lower surface 230B. The tabs 230 are disposed on resilient arms 231. The resilient arms 231 comprise a portion of the regulator body 205 that is separated from the remaining portion of the regulator body 205 by a space 232. In an embodiment, the upper surface 230A of the tabs 230 is oriented at approximately a 90° angle to the outer diameter of the regulator body 205, and the lower surface 230B is oriented at approximately a 45° angle to the outer diameter of the regulator body 205. However, the upper surface 230A and the lower surface 230B may be oriented at any angle that permits engagement with a generally annular groove 245 (best seen in FIGS. 1 and 2) disposed on the inner surface of the channel 215.

In an embodiment, the resilient arms 231 may be shorter than the remaining portion of the regulator body 205. In another embodiment, the resilient arms 231 may also be angled outward from the remaining portion of the regulator body 205. A person having skill in the relevant art will recognize that the tabs 230 may comprise shapes and orientations different from those described without departing from the principles disclosed herein. In certain embodiments (not depicted), the regulator 200 may comprise a plurality of tabs on a plurality of arms, or upon a single annular tab.

Figure 2:
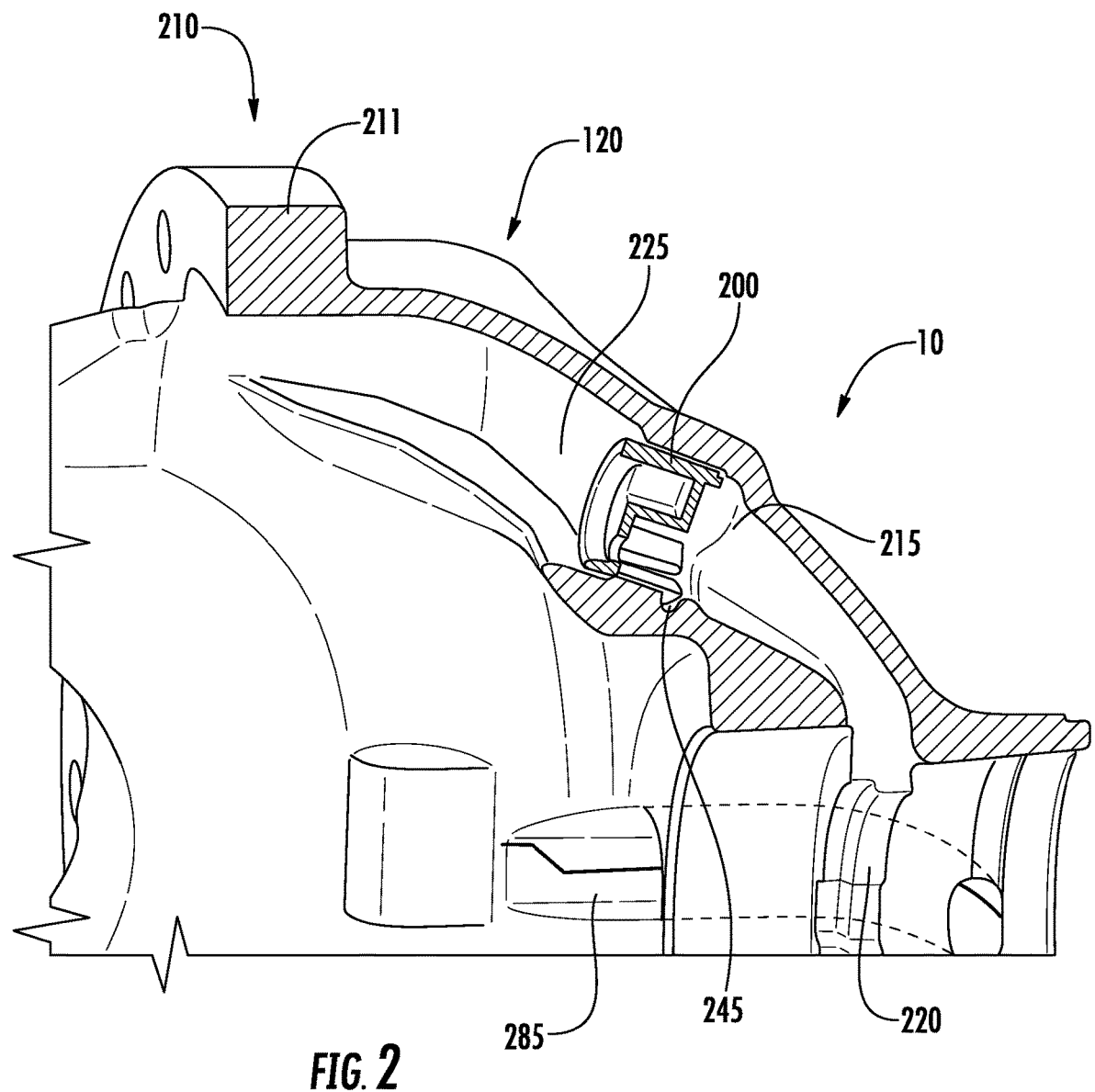
FIG. 2 is a cross-sectional view of a portion of the axle housing of FIG. 1.

As illustrated in FIGS. 1 and 2, the regulator 200 may be coupled with the channel 215 via the tabs 230. The tabs 230 engage the generally annular groove 245 disposed on the inner surface of the channel 215. When the regulator 200 is installed in the channel 215, the tabs 230 are compressed radially inward by the force of the inner surface of the channel 215 engaging the lower surface 230B of the tabs 230. As the tabs 230 are compressed, the resilient arms 231 are also compressed and bend elastically inward. When the regulator 200 is inserted into the channel 215 such that the upper surface 230A of the tabs 230 is moved past the first rim of the annular groove 245, the resilient arms 231 rebound elastically and the tabs 230 are inserted into and engage the annular groove 245. When the regulator 200 is fully inserted into the channel 215 such that the tabs 230 engage the annular groove 245, the regulator 200 will not migrate back up the channel 215 during service. In an embodiment, the regulator 200 may not comprise tabs 230 and instead engage the channel 215 via a friction fit between the outer surface of the body 205 and the inner surface of the channel 215.

As a non-limiting example, in an embodiment, the regulator 200 may not comprise a body 205, and the portion 239 may be engaged with the channel 215. The portion 239 may comprise tabs 230 for engaging the channel 215, or the portion 239 may be directly fitted into the channel 215.

Furthermore, the carrier housing forward portion 210 may comprise a lubricant return conduit 285 (best seen in FIG. 2). During operation of the differential apparatus, lubricant may be propelled by the ring gear 135 from the carrier housing 120 into the lubricant catch 225. From the lubricant catch 225, a portion of the lubricant travels through the regulator 200, through the channel 215 and into the bearing cavity 220. After the lubricant passes through the bearings 125, 126, the lubricant then exits the bearing cavity 220 and returns to the carrier housing sump. At least a portion of the lubricant may travel from the bearing cavity 200 to the sump via the return conduit 285.

Figure 8:
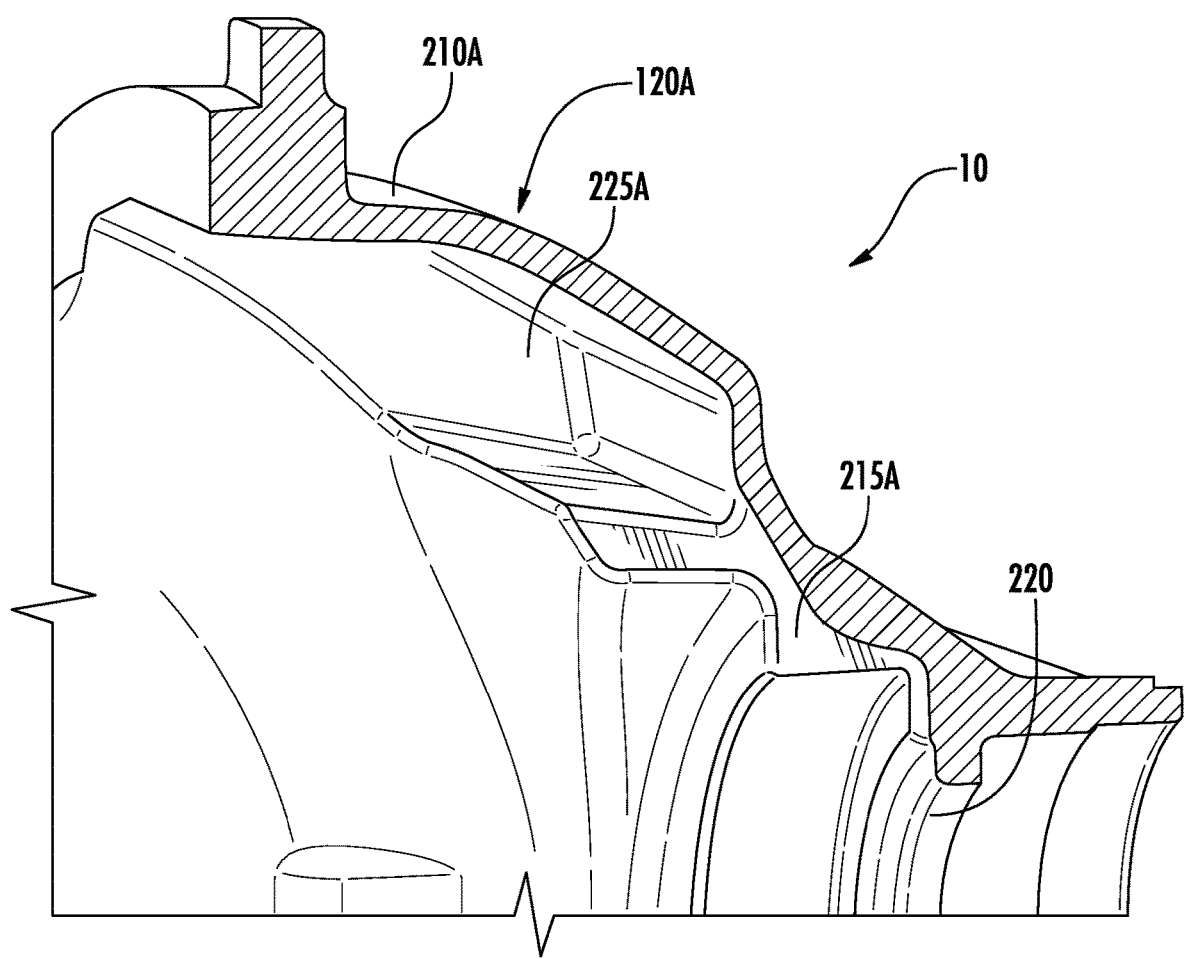
FIG. 8 is a cross-sectional view of a portion of an axle housing according to an embodiment of the presently disclosed subject matter.
Figure 9:
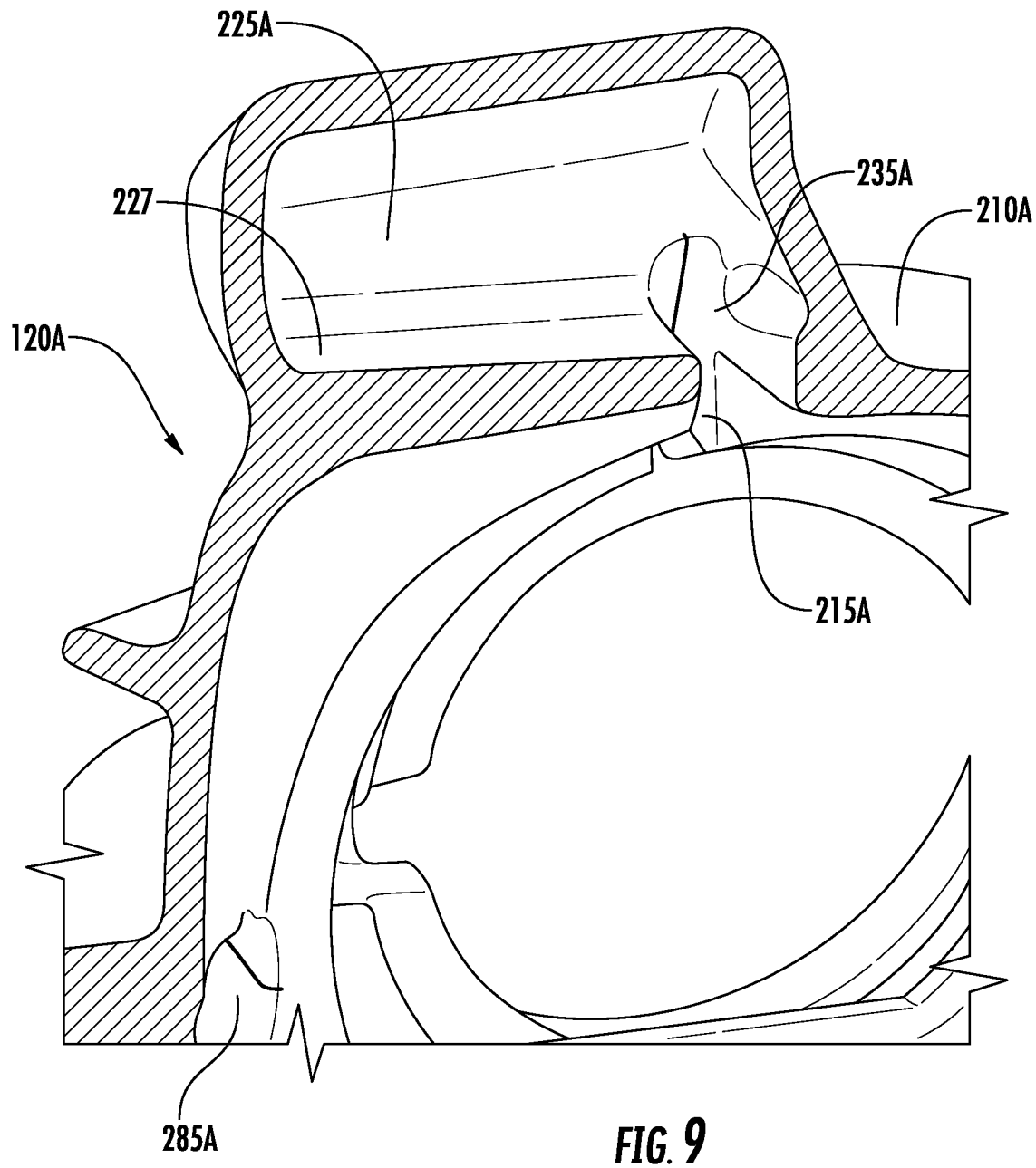
FIG. 9 is a view of a sectioned portion of the axle housing of FIG. 8.
Figure 10:
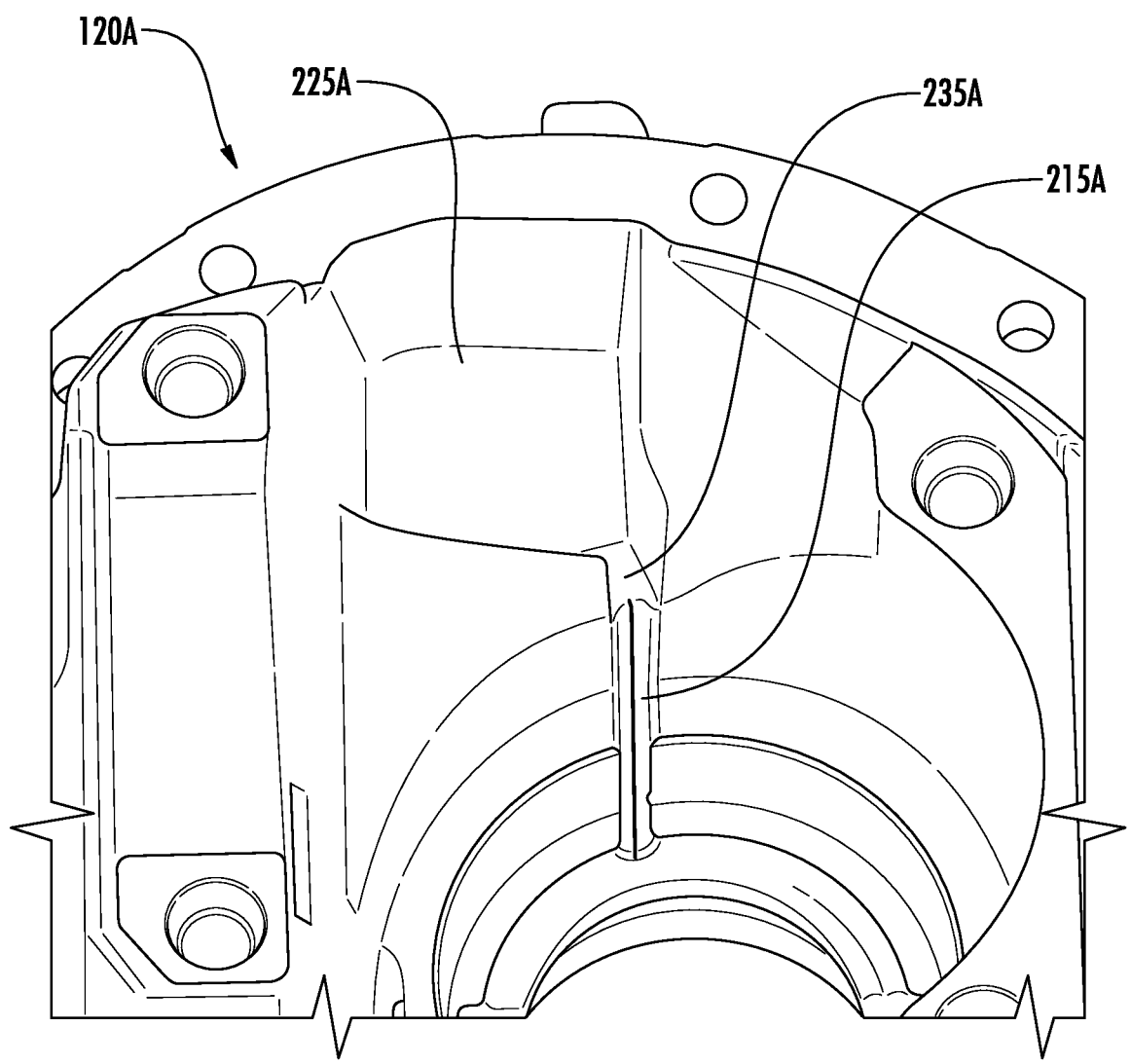
FIG. 10 is another view of a portion of the axle housing of FIG. 8.

In an embodiment, as illustrated in FIGS. 8-10, the lubricant regulating system 10 may not utilize the regulator 200. As illustrated in FIG. 8, a carrier housing 120A includes a forward portion 210A comprising a lubricant channel 215A. The lubricant channel 215A is in fluid communication with the pinion bearing cavity 220 disposed between the pinion bearings 125, 126. The lubricant channel 215A may comprise a groove-like geometry having an open side of the lubricant channel 215A generally facing the pinion shaft 110. In an embodiment, a longitudinal axis of the lubricant channel 215A is generally parallel with the pinion shaft 110. In one embodiment, the lubricant channel 215A is cast with the carrier housing 120A during manufacture thereof. Designing the channel 215A as a feature cast in to the carrier housing forward portion 210A reduces manufacturing costs and ensures a consistency of design tolerances. The channel 215A may have an angle of approximately 21° between the general longitudinal axis of the channel 215A and a horizontal plane. A person having skill in the related art will recognize that the channel 215A may be disposed at a plurality of angles including, but not limited to, angles ranging from 0-180°. Furthermore, the channel 215A may comprise a plurality of portions and surfaces disposed at different angles with respect to each other.

Additionally, the carrier housing forward portion 210A comprises a lubricant catch 225A. The lubricant catch 225A is in fluid communication with the channel 215A. As illustrated in FIGS. 9-10, the lubricant catch 225A comprises a recessed chamber in the carrier housing forward portion 210A. The recessed chamber of the lubricant catch 225A comprises a substantially rectangular-parallelepiped geometry having an open side for receiving lubricant, however the lubricant catch 225A may comprise any shape capable of receiving lubricant; such as, but not limited to, a generally spherical, pyramidal, cylindrical, or parallelepipedal geometry having an opening for catching lubricant slung by the ring gear 135. When the axle assembly 100 is in service, and the ring gear 135 is rotating, a portion of the lubricant carried by teeth of the ring gear 135 is impelled outwardly by the rotation thereof. The lubricant is slung against the carrier housing 210A and into the lubricant catch 225A in a predictable manner.

The lubricant catch 225A also comprises an elongated aperture 235A through which lubricant flows from the lubricant catch 225A into the channel 215A. As illustrated in FIGS. 9-10, the elongated aperture 235A may be disposed through a floor 227 of the lubricant catch 225A. The elongated aperture 235A may extend from the open side of the lubricant catch 225A to a forward wall of the lubricant catch 225A. The elongated aperture 235A and the lubricant catch 225A may also be cast with the carrier housing 120A. In this embodiment, the cast elongated aperture 235A obviates the need for a hole drilled through the lubricant catch 225A to fluidly couple the lubricant catch 225A with the lubricant channel 215A. The length and width of the elongated aperture 235A control the flow rate of lubricant to the pinion bearings 125, 126, thereby reducing axle power consumption by the pinion bearings 125, 126.

Furthermore, the carrier housing forward portion 210A may comprise a lubricant return conduit 285A (best seen in FIG. 9). During operation of the axle assembly 100, lubricant is propelled by the ring gear 135 into the lubricant catch 225A. The lubricant travels through the channel 215A into the bearing cavity 220. After the lubricant passes through the bearings 125, 126, the lubricant then exits the bearing cavity 220 and returns to the carrier housing sump via the return conduit 285A.

Figure 11:
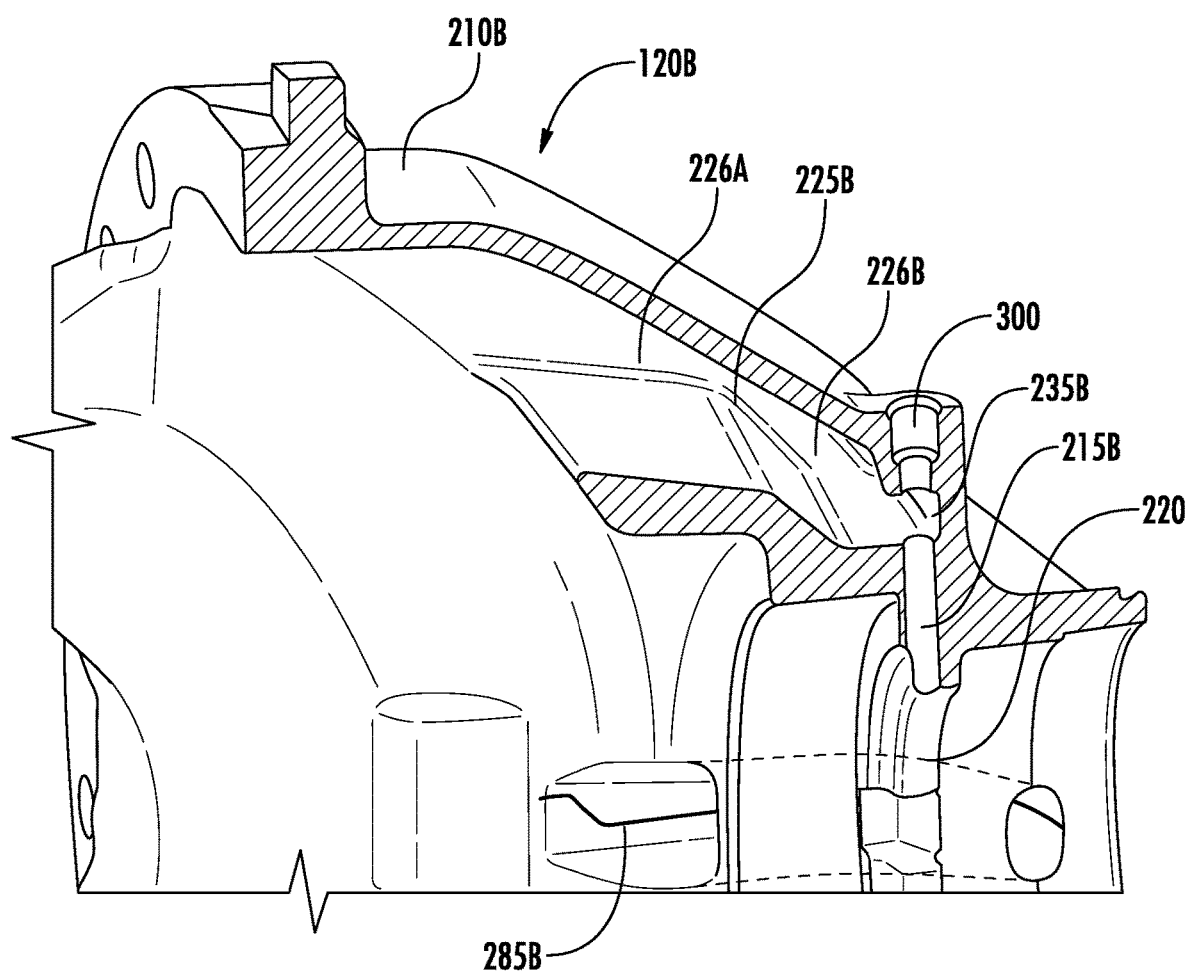
FIG. 11 is a cross-sectional view of a portion of an axle housing according to another embodiment of the presently disclosed subject matter.
Figure 12:
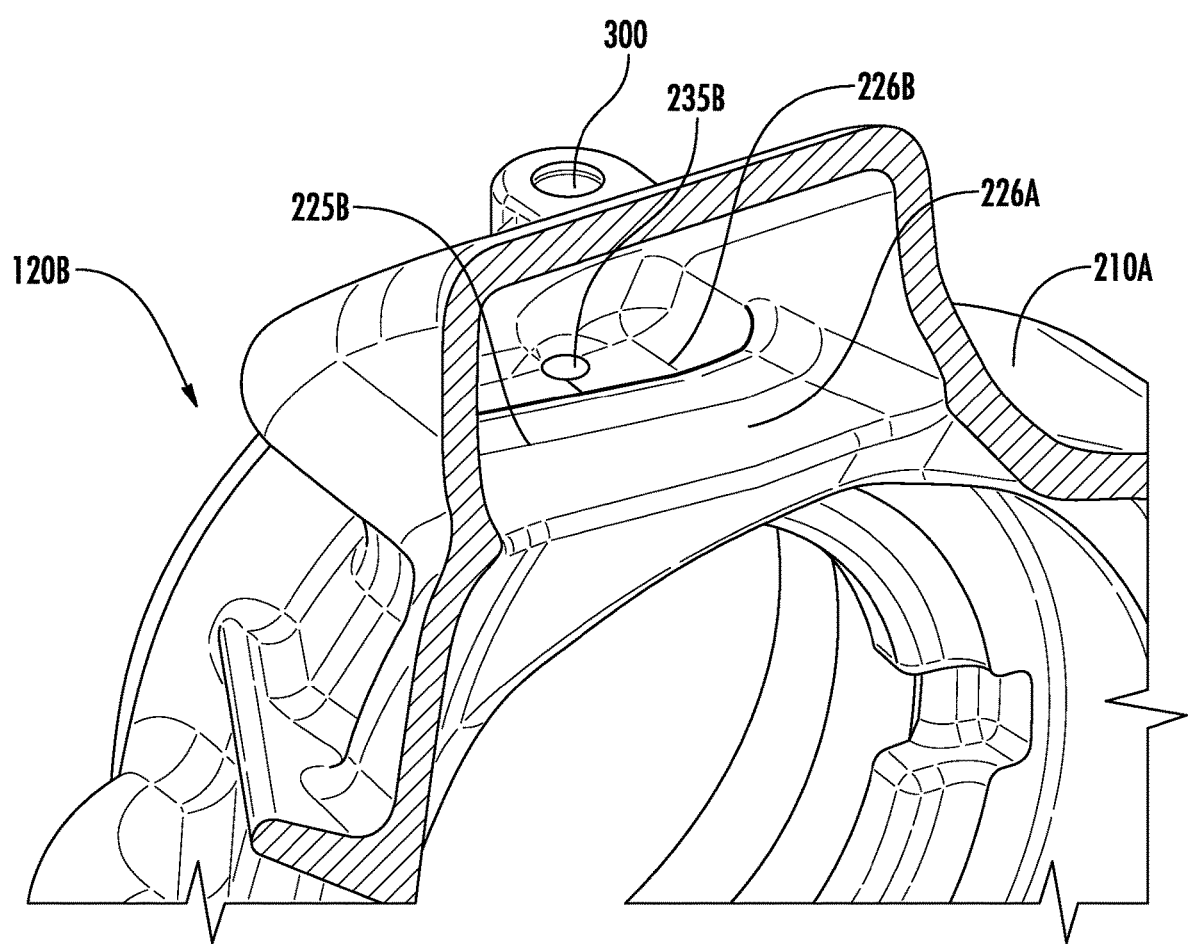
FIG. 12 is a view of a sectioned portion of the axle housing of FIG. 11.

In another embodiment, as illustrated in FIGS. 11-12, the lubricant regulating system 10 may include a carrier housing 120B. The carrier housing 120B comprises a forward portion 210B having a lubricant catch 225B. The lubricant catch 225B may have an upper portion 226A and a lower portion 226B. The lower portion 226B having an aperture 235B through which lubricant flows from the lower portion 226B into a lubricant channel 215b. The lubricant channel 215b comprising a substantially vertical conduit in fluid communication with the lower lubricant catch 226B and the pinion bearing cavity 220.

As illustrated most clearly in FIG. 12, the upper portion 226A and the lower portion 226B each comprise a recessed chamber in the carrier housing forward portion 210B. The lubricant catch upper portion 226A may comprise a substantially rectangular-parallelepiped geometry having an open side for receiving lubricant. The lubricant catch lower portion 226B may comprise a substantially rectangular-parallepiped geometry that defines a smaller volume than the upper portion 226A. In addition, the lower portion 226B includes an open side adjacent to the upper portion 226A configured to receive lubricant from therefrom. In an embodiment, the lubricant catch 225B may comprise only one chamber, instead of having an upper and a lower portion. In one embodiment, the lubricant catch 225B is cast with the carrier housing 120B during manufacture thereof. Designing the lubricant catch 225B as a feature cast in to the carrier housing forward portion 210b reduces manufacturing costs and ensures a consistency of design tolerances.

As illustrated in FIGS. 11-12, the aperture 235B and the channel 215B may be coaxial and generally vertical. Lubricant flows from the lubricant catch lower portion 226B through the aperture 235B and into the channel 215B. From the channel 215b, lubricant flows into the pinion bearing cavity 220. The aperture 235B and the channel 215B may be drilled through a top outside surface of the carrier housing forward portion 210b during manufacture of the carrier housing 120B. In this embodiment, drilling the aperture 235B and the channel 215b creates an aperture 300 in an outside surface of the carrier housing forward portion 210B. A plug (not depicted) may be inserted into the aperture 300 to prevent lubricant from leaving the carrier housing 120b via the aperture 300. In an embodiment, a lubricant return conduit 285B may also be drilled or cast during manufacture of the carrier housing 120B.

Figure 13:
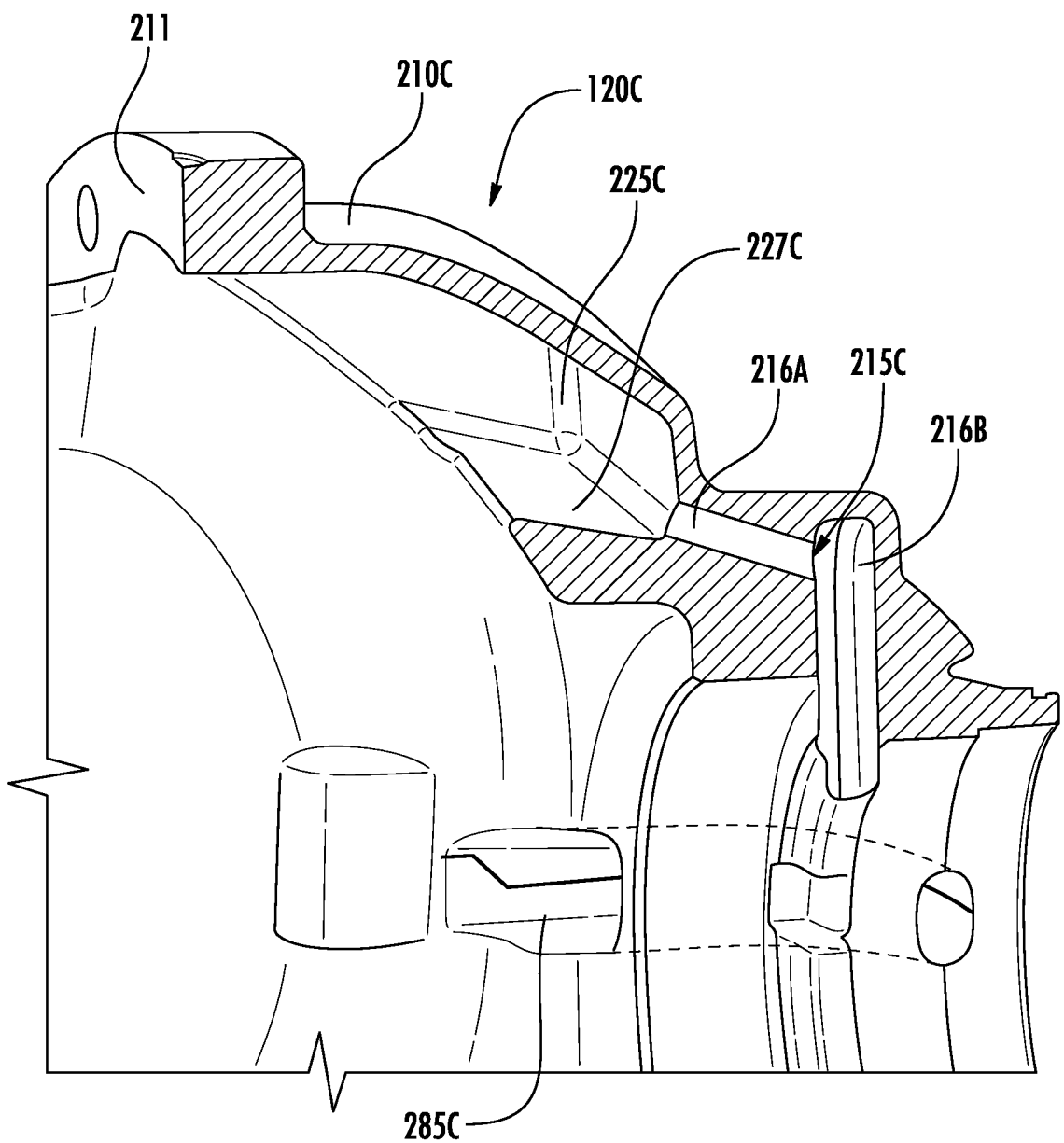
FIG. 13 is a cross-sectional view of a portion of an axle housing according to another embodiment of the presently disclosed subject matter.
Figure 14:
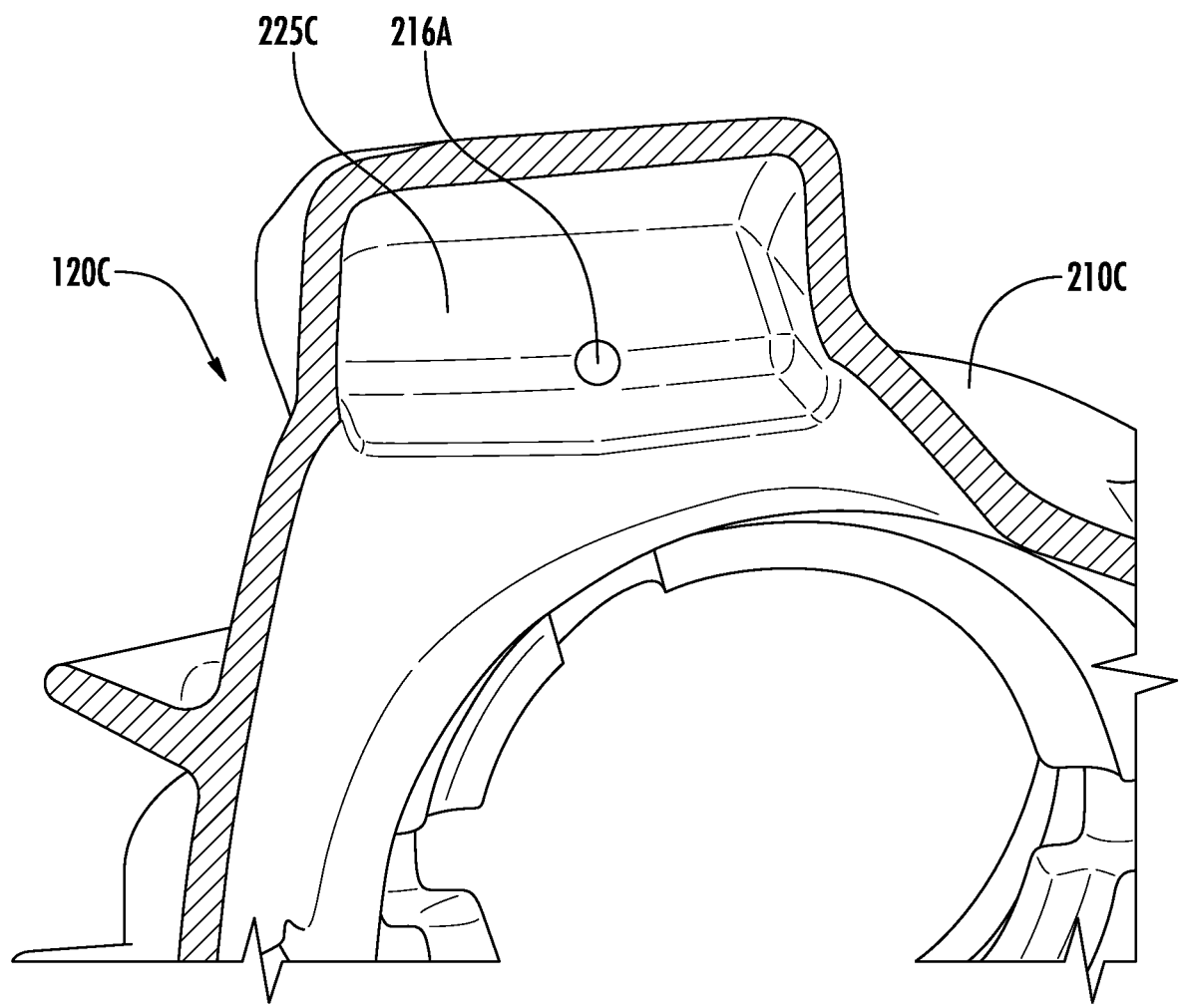
FIG. 14 is a view of a sectioned portion of the axle housing of FIG. 13.

In yet another embodiment, as illustrated in FIGS. 13-14, the lubricant regulating system 10 comprises a carrier housing 120C having a forward portion 210C. The carrier housing forward portion 210C comprises a flange 211 for coupling a carrier housing cover (not depicted) to the forward portion 210C. In addition, the forward portion 210C comprises a lubricant catch 225C in fluid communication with a lubricant channel 215C. The lubricant channel 215C is in fluid communication with a pinion bearing cavity 220.

The lubricant catch 225C comprises a recessed chamber in the carrier housing forward portion 210C. The lubricant catch 225C may comprise a substantially rectangular-parallelepiped geometry having an open side for receiving lubricant, however the lubricant catch 225C may comprise any shape capable of receiving and communicating lubricant to lubricant channel 215C. The lubricant channel 215C comprises a first conduit 216A in fluid communication with the lubricant catch 225C. The lubricant channel first conduit 216A is disposed at a downward angle from the lubricant catch 225C. Further, the first conduit 216A is in fluid communication with a lubricant channel second conduit 216B. In an embodiment, the second conduit 216B may be vertically disposed in the carrier housing forward portion 210C. The second conduit 216B is in fluid communication the pinion bearing cavity 220.

As illustrated in FIGS. 13-14, the first conduit 216A may be disposed through the floor 227C and the forward wall of the lubricant lubricant catch 225C at an angle to the longitudinal axis of the pinion shaft 110 bore. Further, the first conduit 216A may be drilled from the interior of the carrier housing 120C during the manufacture thereof. In addition, the carrier housing forward portion 210C may comprise a lubricant return conduit 285C.

Figure 15:
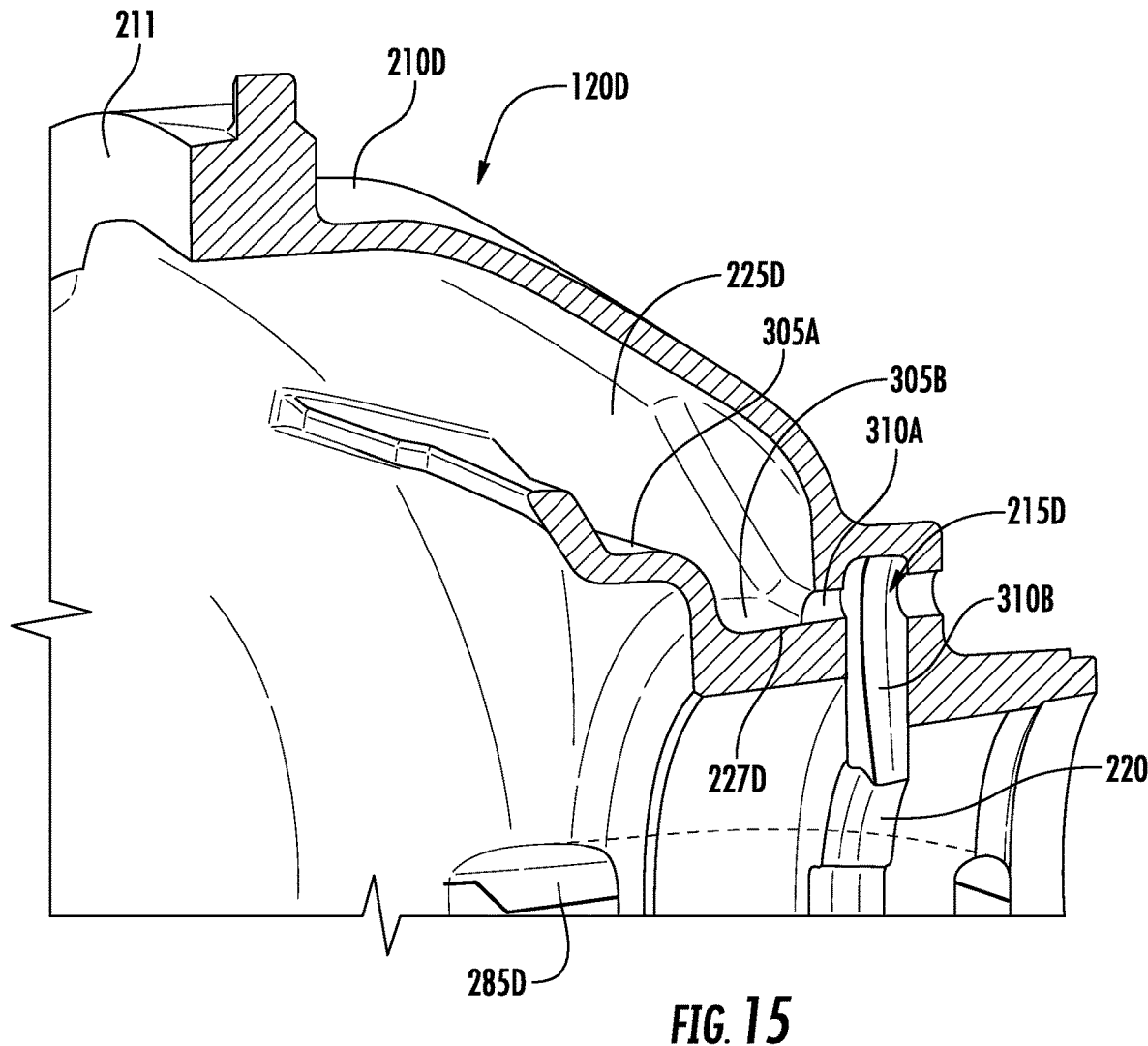
FIG. 15 is a cross-sectional view of a portion of an axle housing according to another embodiment of the presently disclosed subject matter.
Figure 16:
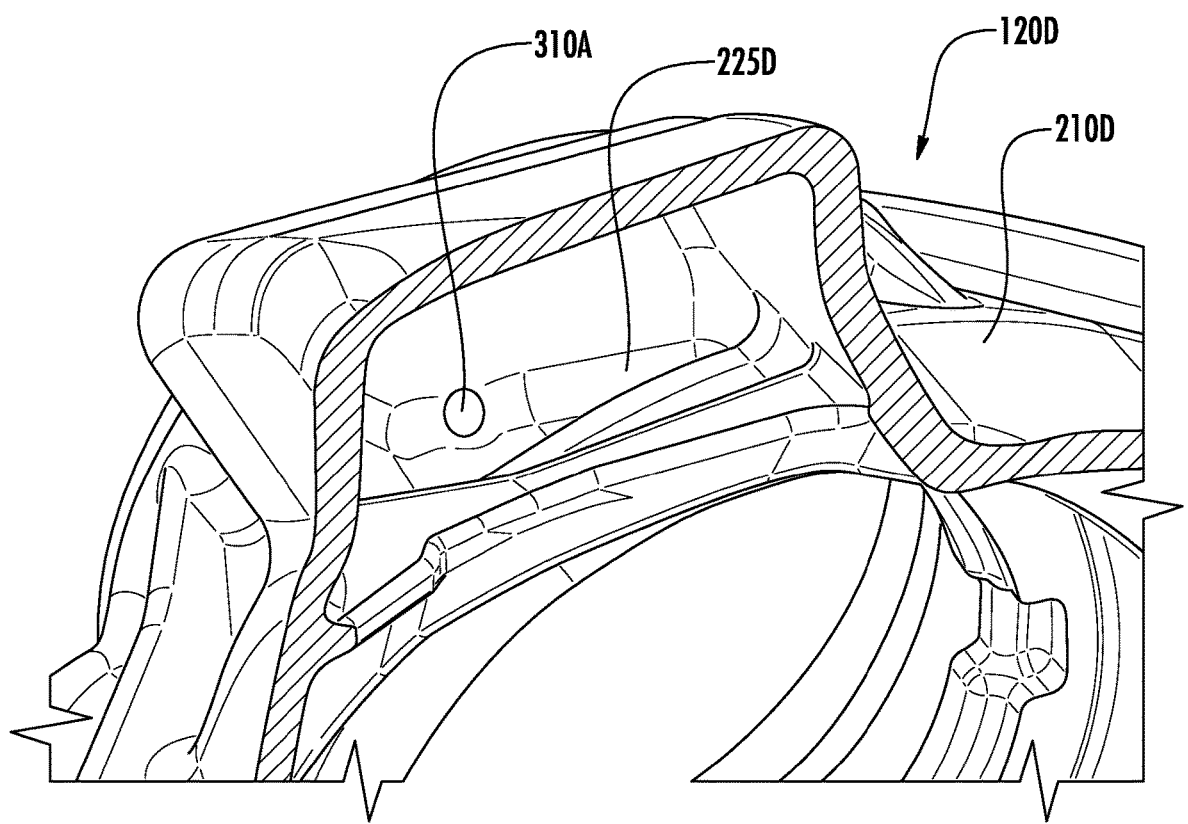
FIG. 16 is a view of a sectioned portion of the axle housing of FIG. 15.

In still another embodiment, as illustrated in FIGS. 15-16, the lubricant regulating system 10 comprises a carrier housing 120D having a forward portion 210D. The carrier housing forward portion 210D comprises a flange 211 for coupling a carrier housing cover (not depicted) to the forward portion 210D. Additionally, the carrier housing forward portion 210D comprises a lubricant catch 225D in fluid communication with a lubricant channel 215D.

The lubricant catch 225D comprises a recessed chamber in the carrier housing forward portion 210D. The lubricant catch 225D may also comprise a first portion 305A and a second portion 305B. Utilizing a lubricant catch first and second portion 305A, 305B may increase the volume of lubricant which may be held in the lubricant catch 225D without substantially increasing the axle assembly 100 package size.

The lubricant channel 215D may comprise a first conduit 310A and a second conduit 310B in fluid communication. As illustrated in FIGS. 15-16, the first conduit 310A may be disposed through the forward wall of the lubricant catch 225D substantially parallel to the longitudinal axis of the pinion shaft 110 bore and a lubricant catch floor 227D. The first conduit 310A connects with the substantially vertical second conduit 310B at a generally 90° angle. Further, the first conduit 310A may be drilled or machined from the exterior of the carrier housing forward portion 210D during the manufacture of the carrier housing 120D. In addition, the carrier housing forward portion 210D may comprise a lubricant return conduit 285D.

Figure 17:
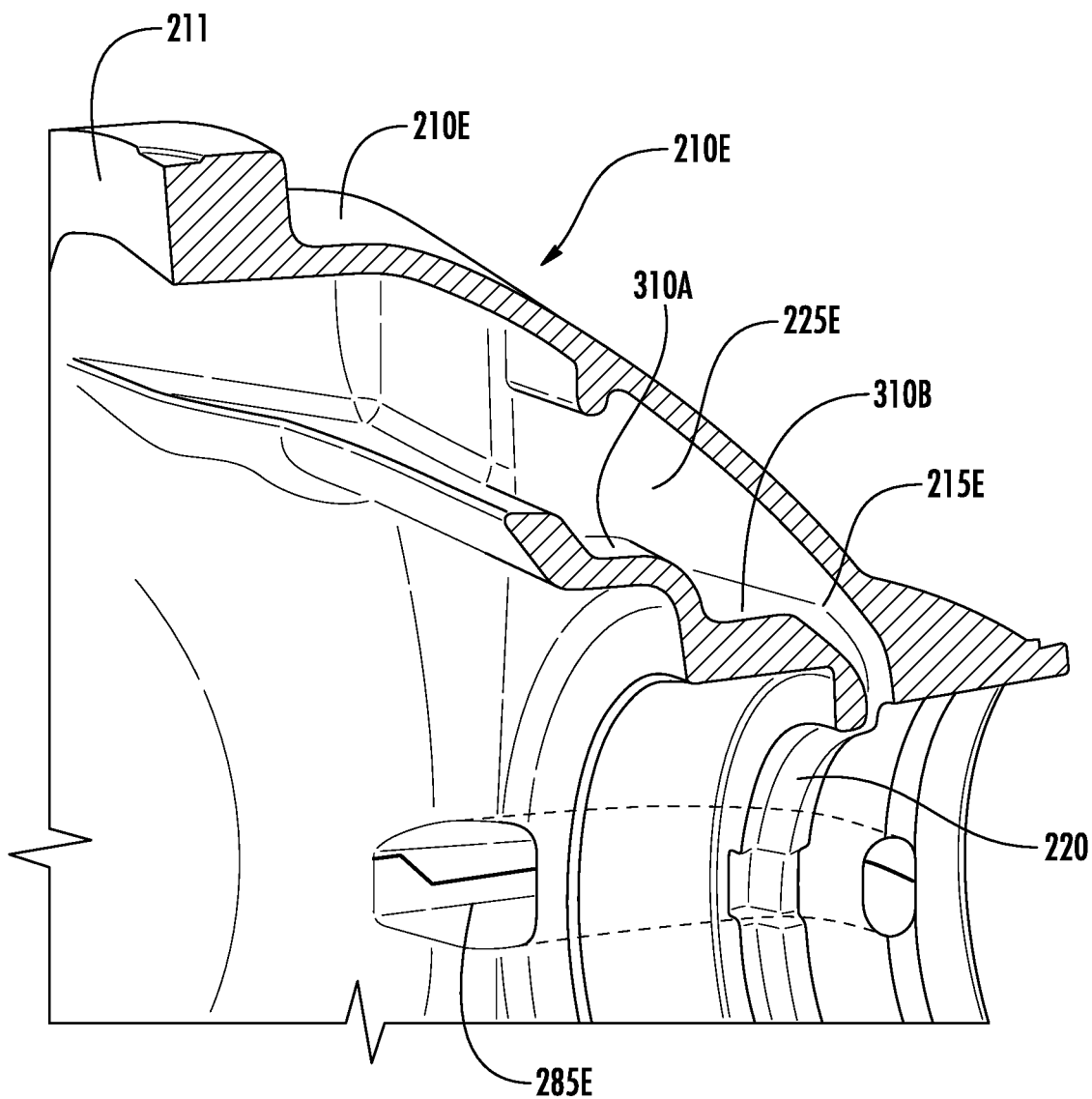
FIG. 17 is a cross-sectional view of a portion of an axle housing according to another embodiment of the presently disclosed subject matter.
Figure 18:
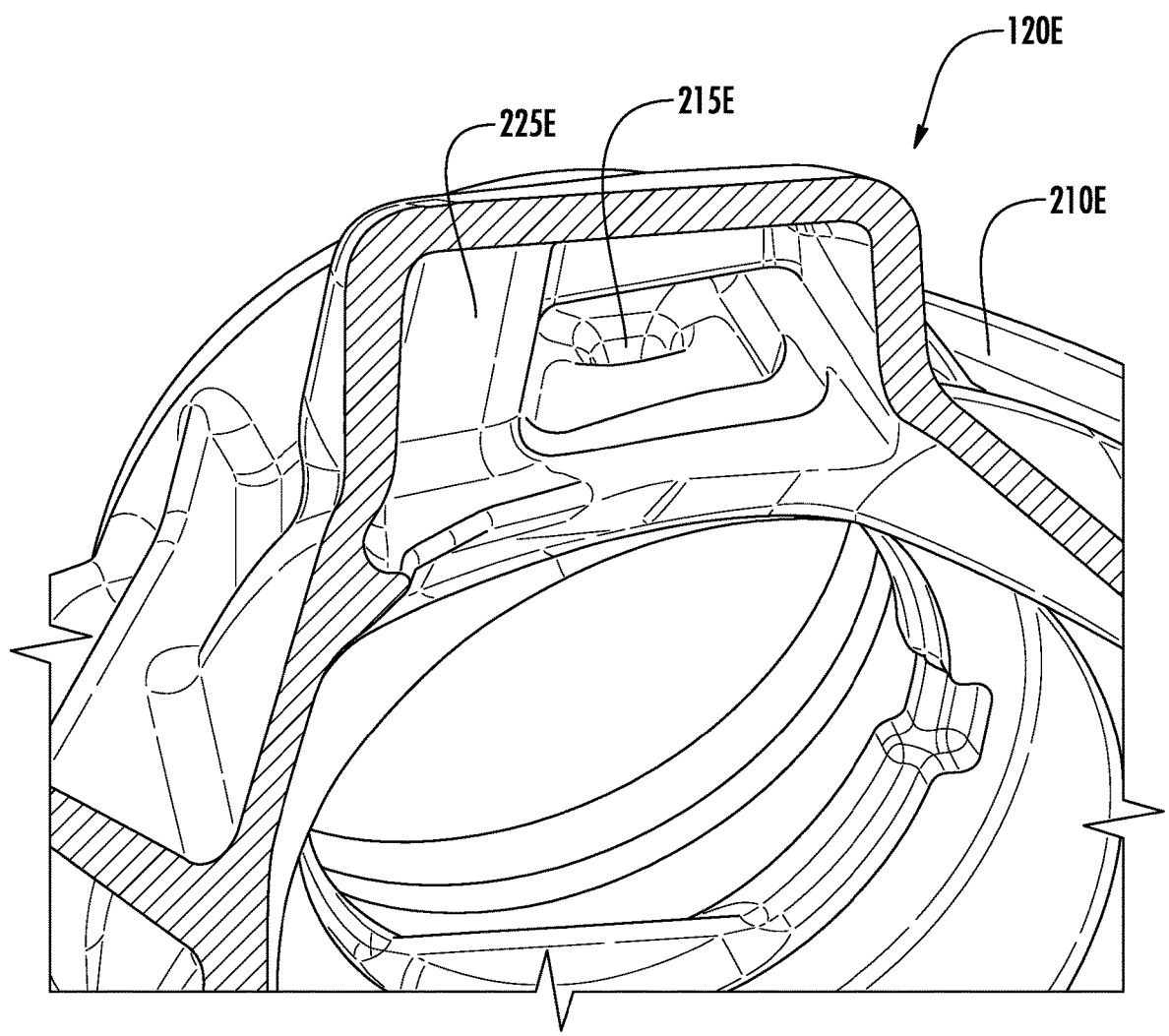
FIG. 18 is a view of a sectioned portion of the axle housing of FIG. 17.

In another embodiment, as illustrated in FIGS. 17-18, the lubricant regulating system 10 comprises a carrier housing 120E having a forward portion 210E. The carrier housing forward portion 210E includes a flange 211 for coupling a carrier housing cover (not depicted) to the forward portion 210E. In addition, the carrier housing forward portion 210E comprises a lubricant catch 225E. The lubricant catch 225E is in fluid communication with a lubricant channel 215E. The lubricant channel 215E is in fluid communication with the pinion bearing cavity 220.

The lubricant catch 225E comprises a recessed chamber in the carrier housing forward portion 210E. The lubricant catch 225E may also comprise a substantially rectangular-parallelepiped geometry having an open side for receiving lubricant; however, the lubricant catch 225E may comprise any shape capable of receiving and communicating lubricant to the lubricant channel 215E. The lubricant catch 225E may include a first portion 310A and a second portion 310B in fluid communication.

The lubricant channel 215E may be a thin conduit cast during the manufacture of the carrier housing 120E. The lubricant channel 215E is in fluid communication with both the lubricant catch 225E and the pinion bearing cavity 220. The lubricant channel 215E may also be positioned at a downward angle from the lubricant catch 225E. In an embodiment, the lubricant channel 215E may comprise a curved or sinuous path of fluid communication between the lubricant catch 225E and the pinion bearing cavity 220. In addition, the carrier housing forward portion 210E may comprise a lubricant return conduit 285E.

While various embodiments have been described above, it should be understood that they have been presented by way of example, and not limitation. It will be apparent to persons skilled in the relevant art that the disclosed subject matter may be embodied in other specific forms without departing from the spirit or essential characteristics thereof. The embodiments described above are therefore to be considered in all respects as illustrative, not restrictive.

What is claimed is:

1. An axle assembly, comprising:
    a carrier housing;
    a ring gear disposed within said carrier housing;
    a pinion meshed with said ring gear, wherein said pinion is coupled with a pinion shaft;
    said pinion shaft rotatably supported in said carrier housing by at least one bearing;
    a sump disposed in said carrier housing;
    a fluid catch disposed in said carrier housing;
    a conduit disposed in said carrier housing, said conduit having a first end in fluid communication with said fluid catch; and
    said conduit having a second end in fluid communication with said at least one bearing; and
    a regulator disposed in said conduit, wherein said regulator further comprises:
        at least one resilient arm coupled therewith; and
        a tab coupled with said at least one resilient arm.

2. The axle assembly according to claim 1, wherein said regulator further comprises:
    a first end and a second end;
    said first end having an annular lip; and
    said lip defining an angled concave depression therein.

3. The axle assembly according to claim 2, wherein said regulator further comprises:
    a portion recessed from said first end; and
    said portion defining an aperture through said regulator.

4. The axle assembly according to claim 3, wherein said regulator further comprises:
    a rectangular cavity disposed in said portion.

5. The axle assembly according to claim 1, further comprising:
    an annular groove disposed in said conduit for receiving said tab.

6. The axle assembly according to claim 1, wherein said regulator further comprises:
    a rectangular projection disposed on an outer surface thereof.

7. The axle assembly according to claim 6, further comprising:
    a rectangular slot disposed in said conduit for receiving said rectangular projection.

8. The axle assembly according to claim 1, wherein said conduit further comprises:
    a groove having an opening the length thereof, wherein at least a portion of said opening is downward facing.

9. The axle assembly according to claim 8, wherein said fluid catch further comprises:
    an aperture through a floor of said fluid catch, wherein said aperture is disposed the length of said fluid catch; and
    said aperture is in fluid communication with said conduit.

10. The axle assembly according to claim 1, wherein said fluid catch further comprises:
    a first portion and a second portion, wherein said first portion is disposed above said second portion.

11. The axle assembly according to claim 1, wherein said conduit further comprises:
    a first portion machined into said carrier housing; and
    a second portion cast in said carried housing.

12. The axle assembly according to claim 1, further comprising:
    a return conduit in fluid communication with said at least one bearing and said sump.

13. An axle assembly, comprising:
    a carrier housing;
    a ring gear disposed within said carrier housing;
    a pinion meshed with said ring gear, wherein said pinion is coupled with a pinion shaft;
    said pinion shaft rotatably supported in said carrier housing by at least one bearing;
    a sump disposed in said carrier housing;

a fluid catch disposed in said carrier housing;
a conduit disposed in said carrier housing, said conduit having a first end in fluid communication with said fluid catch; and
said conduit having a second end in fluid communication with said at least one bearing; and
a regulator disposed in said conduit, wherein said regulator further comprises:
a first end and a second end;
said first end having an annular lip; and
said lip defining an angled concave depression therein.

14. The axle assembly according to claim 13, wherein said regulator further comprises:
a portion recessed from said first end; and
said portion defining an aperture through said regulator.

15. The axle assembly according to claim 14, wherein said regulator further comprises:
a rectangular cavity disposed in said portion.

16. An axle assembly, comprising:
a carrier housing;
a ring gear disposed within said carrier housing;
a pinion meshed with said ring gear, wherein said pinion is coupled with a pinion shaft;
said pinion shaft rotatably supported in said carrier housing by at least one bearing;
a sump disposed in said carrier housing;
a fluid catch disposed in said carrier housing;
a conduit disposed in said carrier housing, said conduit having a first end in fluid communication with said fluid catch; and
said conduit having a second end in fluid communication with said at least one bearing; and
a regulator disposed in said conduit, wherein said regulator further comprises:
a rectangular projection disposed on an outer surface thereof.

17. The axle assembly according to claim 16, further comprising:
a rectangular slot disposed in said conduit for receiving said rectangular projection.

* * * * *